United States Patent
Barsness et al.

(10) Patent No.: US 8,572,723 B2
(45) Date of Patent: Oct. 29, 2013

(54) UTILIZING VIRTUAL PRIVATE NETWORKS TO PROVIDE OBJECT LEVEL SECURITY ON A MULTI-NODE COMPUTER SYSTEM

(75) Inventors: Eric Lawrence Barsness, Pine Island, MN (US); David L. Darrington, Rochester, MN (US); Amanda Randles, Cambridge, MA (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/372,653

(22) Filed: Feb. 14, 2012

(65) Prior Publication Data

US 2012/0151573 A1 Jun. 14, 2012

Related U.S. Application Data

(62) Division of application No. 12/127,077, filed on May 27, 2008, now Pat. No. 8,424,076.

(51) Int. Cl.
G06F 9/00 (2006.01)

(52) U.S. Cl.
USPC ............ 726/15; 726/2; 726/14; 713/171; 380/278; 370/356; 370/401; 379/220.01; 707/769

(58) Field of Classification Search
USPC ............ 726/2, 14, 15; 713/171; 380/278; 370/356, 401; 379/220.01; 707/769
See application file for complete search history.

(56) References Cited

U.S. PATENT DOCUMENTS

| 6,453,034 | B1 * | 9/2002 | Donovan et al. ......... 379/220.01 |
| 7,594,262 | B2 | 9/2009 | Hanzlik et al. |
| 8,316,044 | B2 * | 11/2012 | Baffier et al. .................. 707/769 |
| 2004/0090972 | A1 | 5/2004 | Barrett et al. |
| 2005/0265308 | A1 | 12/2005 | Barbir et al. |

OTHER PUBLICATIONS

Eric L. Barsness, et al. U.S. Appl. No. 11/834,813, "Query Optimization in a Parallel Computer System to Reduce Network Traffic", filed Aug. 7, 2007.
Eric L. Barsness, et al. U.S. Appl. No. 11/834,816, "Query Optimization in a Parallel Computer System with Multiple Networks", filed Aug. 7, 2007.

(Continued)

Primary Examiner — Thanhnga B Truong
(74) Attorney, Agent, or Firm — Martin & Associates, LLC; Bret J. Petersen

(57) ABSTRACT

The disclosure herein provides data security on a parallel computer system using virtual private networks connecting the nodes of the system. A mechanism sets up access control data in the nodes that describes a number of security classes. Each security class is associated with a virtual network. Each user on the system is associated with one of the security classes. Each database object to be protected is given an attribute of a security class. Database objects are loaded into the system nodes that match the security class of the database object. When a query executes on the system, the query is sent to a particular class or set of classes such that the query is only seen by those nodes that are authorized by the equivalent security class. In this way, the network is used to isolate data from users that do not have proper authorization to access the data.

7 Claims, 7 Drawing Sheets

(56) References Cited

OTHER PUBLICATIONS

Eric L. Barsness, et al. U.S. Appl. No. 11/834,823, "Query Execution and Optimization with Autonomic Error Recovery from Network Failures in a Parallel Computer System with Multiple Networks", filed Aug. 7, 2007.

Eric L. Barsness, et al. U.S. Appl. No. 11/834,827, "Query Execution and Optimization Utilizing a Combining Network in a Parallel Computer System", filed Aug. 7, 2007.

Eric L. Barsness, et al. U.S. Appl. No. 11/861,343, "Inserting Data Into an In-Memory Distributed Nodal Database", filed Sep. 26, 2007.

* cited by examiner

Access Control Data – Object and Row Security Class

| Database Object | Security Class |
|---|---|
| Rows 1-20 | SC2 |
| Rows 20-40 | SC3 |
| Address | SC2 |
| SS # | SC4 |

(12) United States Patent
US 8,572,723 B2

UTILIZING VIRTUAL PRIVATE NETWORKS TO PROVIDE OBJECT LEVEL SECURITY ON A MULTI-NODE COMPUTER SYSTEM

CROSS-REFERENCE TO RELATED APPLICATION

This patent application is a divisional of U.S. Ser. No. 12/127,077 filed on May 27, 2008, which is incorporated herein by reference.

BACKGROUND

1. Technical Field

The disclosure and claims herein generally relate to multi-node computer systems, and more specifically relate to using virtual private networks to provide object level security for database objects on a multi-node computer system.

2. Background Art

Supercomputers and other multi-node computer systems continue to be developed to tackle sophisticated computing jobs. One type of multi-node computer system is a massively parallel computer system. A family of such massively parallel computers is being developed by International Business Machines Corporation (IBM) under the name Blue Gene. The Blue Gene/L system is a high density, scalable system in which the current maximum number of compute nodes is 65,536. The Blue Gene/L node consists of a single ASIC (application specific integrated circuit) with 2 CPUs and memory. The full computer is housed in 64 racks or cabinets with 32 node boards in each rack.

Computer systems such as Blue Gene have a large number of nodes, each with its own processor and local memory. The nodes are connected with several communication networks. One communication network connects the nodes in a logical tree network. In the logical tree network, the Nodes are connected to an input-output (I/O) node at the top of the tree. In Blue Gene, there are 2 compute nodes per node card with 2 processors each. A node board holds 16 node cards and each rack holds 32 node boards. A node board has slots to hold 2 I/O cards that each have 2 I/O nodes. The nodes on two node boards can be configured in a virtual tree network that communicate with the I/O nodes.

Multi-node computer systems such as Blue Gene support the possibility of an in memory database. An in memory database is one where some portion of the database, or the entire database resides completely in memory rather than in bulk storage. An in memory database could provide an extremely fast response time for searches or queries of the database. A concern of all computer systems is data security. Some prior art data security techniques may not be effective or readily implemented on a parallel computer system, and in particular one with an in memory database.

Without an efficient way to provide object level security for database objects, multi-node computer systems will continue to suffer from reduced data security and reduced efficiency of the computer system.

BRIEF SUMMARY

The specification and claims herein are directed to providing data security on a parallel computer system using virtual private networks connecting the nodes of the system. An access setup mechanism sets up access control data in the nodes that describes a number of security classes. Each security class is associated with a virtual network. Each user on the system is associated with one of the security classes. Each database object that is to be protected is given an attribute of a security class. Database objects are loaded into the system nodes that match the security class of the database object. When a query executes on the system, the query is sent to a particular class or set of classes such the query is only seen by those nodes that are authorized by the equivalent security class. In this way, the network is used to isolate data from user that do not have proper authorization to access the data.

The description and examples herein are directed to a massively parallel computer system such as the Blue Gene architecture, but the claims herein expressly extend to other parallel computer systems with multiple processors arranged in a network structure.

The foregoing and other features and advantages will be apparent from the following more particular description, and as illustrated in the accompanying drawings.

BRIEF DESCRIPTION OF DRAWINGS

The disclosure will be described in conjunction with the appended drawings, where like designations denote like elements, and.

DETAILED DESCRIPTION

The description and claims herein are directed to providing data security on a parallel computer system using virtual private networks connecting the nodes of the system. An access setup mechanism sets up access control data in the nodes that describes a number of security classes. Each security class is associated with a virtual network. Each user on the system is associated with one of the security classes. Each database object that is to be protected is given an attribute of a security class. Database objects are loaded into the system nodes that match the security class of the database object. When a query executes on the system, the query is sent to a particular class or set of classes such the query is only seen by those nodes that are authorized by the equivalent security class. In this way, the network is used to isolate data from users that do not have proper authorization to access the data.

In the illustrated example below, the access control mechanism provides access to protected database objects on compute nodes of a parallel computer system. Only authorized access is allowed on a virtual private network of a compute node. The examples herein will be described with respect to the Blue Gene/L massively parallel computer developed by International Business Machines Corporation (IBM).

Figure 1:
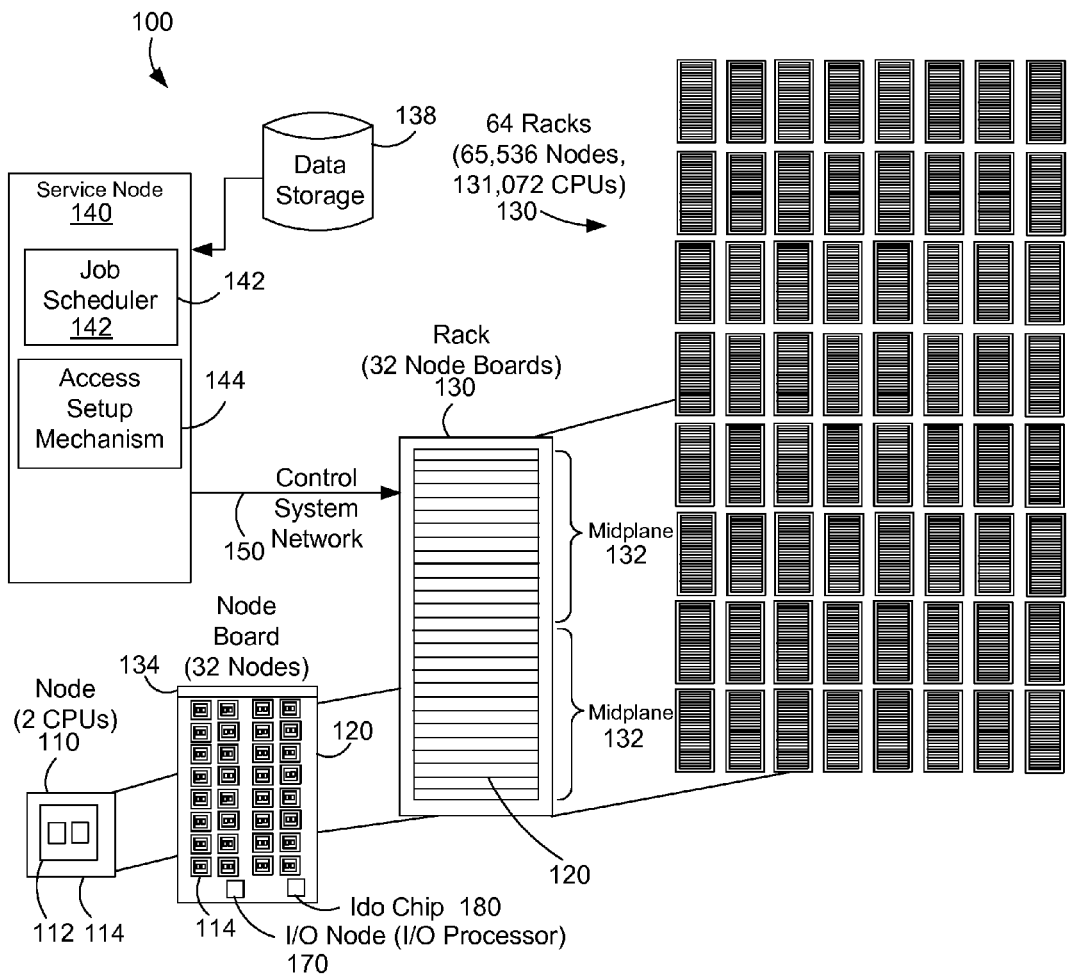
FIG. 1 is a block diagram of a massively parallel computer system.

FIG. 1 shows a block diagram that represents a massively parallel computer system 100 such as the Blue Gene/L computer system. The Blue Gene/L system is a scalable system in which the maximum number of compute nodes is 65,536. Each node 110 has an application specific integrated circuit (ASIC) 112, also called a Blue Gene/L compute chip 112. The compute chip incorporates two processors or central processor units (CPUs) and is mounted on a node daughter card 114. The node also typically has 512 megabytes of local memory (not shown). A node board 120 accommodates 32 node daughter cards 114 each having a node 110. Thus, each node board has 32 nodes, with 2 processors for each node, and the associated memory for each processor. A rack 130 is a housing that contains 32 node boards 120. Each of the node boards 120 connect into a midplane printed circuit board 132 with a midplane connector 134. The midplane 132 is inside the rack and not shown in FIG. 1. The full Blue Gene/L computer system would be housed in 64 racks 130 or cabinets with 32 node boards 120 in each. The full system would then have 65,536 nodes and 131,072 CPUs (64 racks×32 node boards× 32 nodes×2 CPUs).

The Blue Gene/L computer system structure can be described as a compute node core with an I/O node surface, where each I/O node has an I/O processor connected to the service node 140. The I/O nodes 170 have no local storage. The I/O nodes are connected to the compute nodes through the logical tree network and also have functional wide area network capabilities through a gigabit ethernet network (See FIG. 2 below). The gigabit Ethernet network is connected to an I/O processor (or Blue Gene/L link chip) in the I/O node 170 located on a node board 120 that handles communication from the service node 160 to a number of nodes. The Blue Gene/L system has one or more I/O nodes 170 connected to the node board 120. The I/O processors can be configured to communicate with 8, 32 or 64 nodes. The service node 140 uses the gigabit network to control connectivity by communicating to link cards on the compute nodes. The connections to the I/O nodes are similar to the connections to the compute node except the I/O nodes are not connected to the torus network that interconnects the compute nodes.

Again referring to FIG. 1, the computer system 100 includes a service node 140 that handles the loading of the nodes with software and controls the operation of the whole system. The service node 140 is typically a mini computer system such as an IBM pSeries server running Linux with a control console (not shown). The service node 140 is connected to the racks 130 of compute nodes 110 with a control system network 150. The control system network provides control, test, and bring-up infrastructure for the Blue Gene/L system. The control system network 150 includes various network interfaces that provide the necessary communication for the massively parallel computer system. The network interfaces are described further below.

The service node 140 communicates through the control system network 150 dedicated to system management. The control system network 150 includes a private 100-Mb/s Ethernet connected to an Ido chip 180 located on a node board 120 that handles communication from the service node 160 to a number of nodes. This network is sometime referred to as the JTAG network since it communicates using the JTAG protocol. All control, test, and bring-up of the compute nodes 110 on the node board 120 is governed through the JTAG port communicating with the service node.

The service node includes a job scheduler 142 for allocating and scheduling work processes and data placement on the compute nodes. The service node further includes an access setup mechanism 144 that sets up access control data (described below with reference to FIG. 2) to setup the virtual channels that correspond to a security class, and also what users have the related security class. The access control data further includes a security class for database objects. The access control data may actually reside in other locations of the system and security class of database objects may be derived from other data as described further below.

Figure 2:
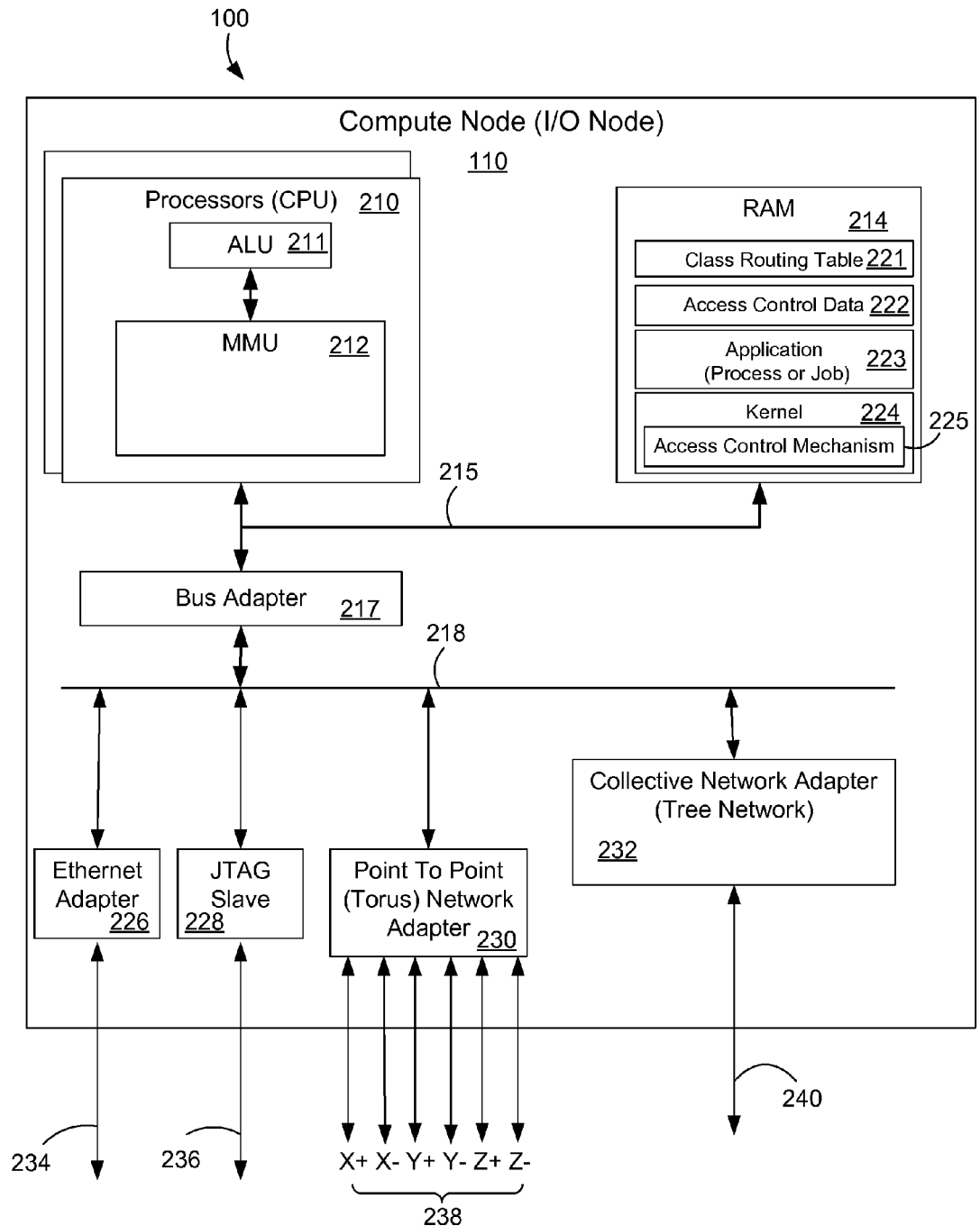
FIG. 2 is a block diagram of a compute node in a massively parallel computer system.

FIG. 2 illustrates a block diagram of an exemplary compute node as introduced above. FIG. 2 also represents a block diagram for an I/O node, which has the same overall structure as the compute node. A notable difference between the compute node and the I/O nodes is that the Ethernet adapter 226 is connected to the control system on the I/O node but is not used in the compute node. The compute node 110 of FIG. 2 includes a plurality of computer processors 210, each with an arithmetic logic unit (ALU) 211 and a memory management unit (MMU) 212. The processors 210 are connected to random access memory ('RAM') 214 through a high-speed memory bus 215. Also connected to the high-speed memory bus 214 is a bus adapter 217. The bus adapter 217 connects to an extension bus 218 that connects to other components of the compute node.

Again referring to FIG. 2, stored in RAM 214 is a class routing table 221, access control data 222, an application 223 and an operating system kernel 224 with an access control mechanism 225 described below. The class routing table 221 stores data for routing data packets on the collective network or tree network as described more fully below. The access control data 222 is information that is used by the access control mechanism to control access to private data as described below. The application 223 is a user software application, process or job that is loaded on the node by the control system to perform a designated task. The application program typically runs in parallel with application programs running on adjacent nodes. The operating system kernel 224 is a module of computer program instructions and routines for an application program's access to other resources of the compute node. The quantity and complexity of tasks to be performed by an operating system on a compute node in a massively parallel computer are typically smaller and less complex than those of an operating system on a typical stand alone computer. The operating system may therefore be quite lightweight by comparison with operating systems of general purpose computers, a pared down version as it were, or an operating system developed specifically for operations on a particular massively parallel computer. Operating systems that may usefully be improved or simplified for use in a compute node include UNIX, Linux, Microsoft XP, Microsoft Vista, AIX, IBM's i5/OS, and others as will occur to those of skill in the art.

The compute node 110 of FIG. 2 includes several communications adapters 226, 228, 230, 232 for implementing data communications with other nodes of a massively parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network.

The data communications adapters in the example of FIG. 2 include a Gigabit Ethernet adapter 226 that couples example I/O node 110 for data communications to a Gigabit Ethernet 234. In Blue Gene, this communication link is only used on I/O nodes and is not connected on the compute nodes. Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit 228 that couples the compute node 110 for data communications to a JTAG Master circuit over a JTAG network 236. JTAG is the usual name used for the IEEE 1149.1 standard entitled Standard Test Access Port and Boundary-Scan Architecture for test access ports used for testing printed circuit boards using boundary scan. JTAG boundary scans through JTAG Slave 228 may efficiently configure processor registers and memory in compute node 110.

The data communications adapters in the example of FIG. 2 include a Point To Point Network Adapter 230 that couples the compute node 110 for data communications to a network 238. In Blue Gene, the Point To Point Network is typically configured as a three-dimensional torus or mesh. Point To Point Adapter 230 provides data communications in six directions on three communications axes, x, y, and z, through six bidirectional links 238: +x, −x, +y, −y, +z, and −z. The torus network logically connects the compute nodes in a lattice like structure that allows each compute node 110 to communicate with its closest 6 neighbors.

The data communications adapters in the example of FIG. 2 include a collective network or tree network adapter 232 that couples the compute node 110 for data communications to a network 240 configured as a binary tree. This network is also sometimes referred to as the collective network. Collective network adapter 232 provides data communications through three bidirectional links: two links to children nodes and one link to a parent node (not shown). The collective network adapter 232 of each node has additional hardware to support operations on the collective network.

Again referring to FIG. 2, the collective network 240 extends over the compute nodes of the entire Blue Gene machine, allowing data to be sent from any node to all others (broadcast), or a subset of nodes. Each node typically has three links, with one or two links to a child node and a third connected to a parent node. Arithmetic and logical hardware is built into the collective network to support integer reduction operations including min, max, sum, bitwise logical OR, bitwise logical AND, and bitwise logical XOR. The collective network is also used for global broadcast of data, rather than transmitting it around in rings on the torus network. For one-to-all communications, this is a tremendous improvement from a software point of view over the nearest-neighbor 3D torus network.

Figure 3:
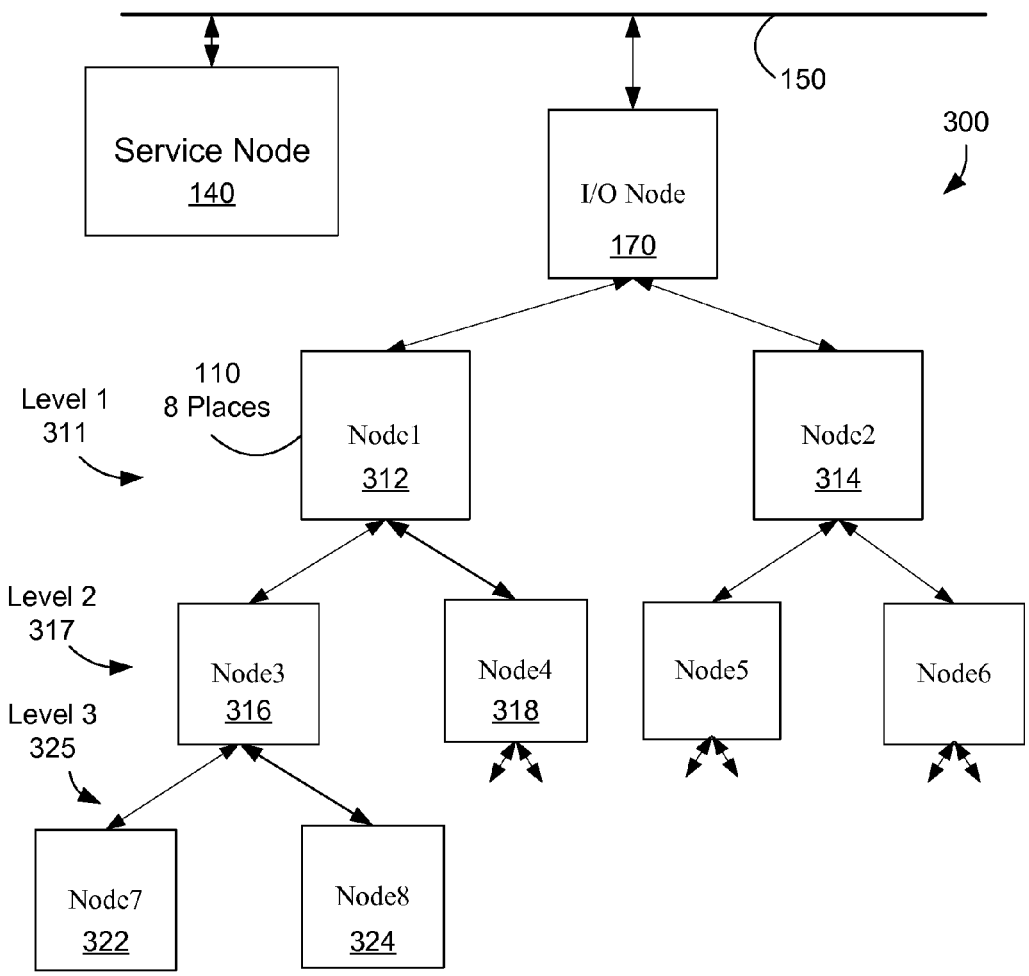
FIG. 3 shows a block diagram of compute nodes arranged in a virtual tree network.

FIG. 3 illustrates a portion of the collective network or tree network shown as 240 in FIG. 2. The collective or tree network 300 is connected to the service node 140 through the control system network 150. The tree network 300 is a group of compute nodes 110 connected an I/O node 170 in a logical tree structure. The I/O node 170 is connected to one or more compute nodes 110. Each of the compute nodes Node1 312, and Node2 314 are connected directly to the I/O node 170 and form the top of the tree or a first level 311 for a set of nodes connected below each of Node1 312 and Node2 314. Node1 312 is the top of a tree network and has child nodes Node3 316 and Node4 318 on a second level 317. Similarly, Node3 316 has child nodes Node7 322 and Node8 324 on a third level 325. Many of the child nodes are not shown for simplicity, but the tree network 300 could contain any number of nodes with any number of levels.

A user partition is a group of nodes that is formed to execute a user application. When a user partition is formed, an independent collective network is formed for the partition; it includes all nodes in the partition (and no nodes in any other partition). In the collective network, each node contains a class routing table that is used in conjunction with a small header field in each packet of data sent over the network to determine a class. The class is used to locally determine the routing of the packet. With this technique, multiple independent collective networks called virtual channels are virtualized in a single physical network with one or more I/O nodes for the virtual network. Two standard examples of this are the class that connects a small group of compute nodes to an I/O node and a class that includes all the compute nodes in the system.

Figure 4:
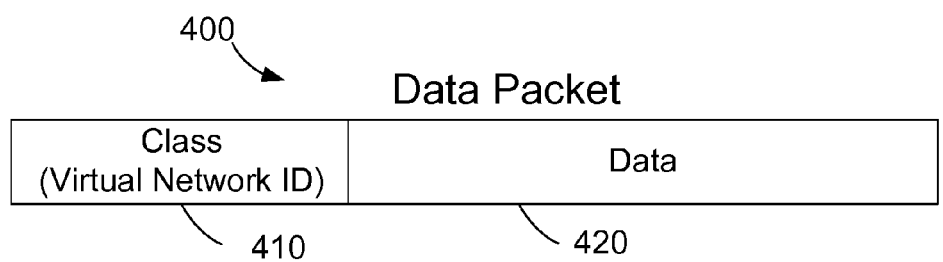
FIG. 4 shows a data packet for communicating on a virtual tree network in a massively parallel computer system.

FIG. 4 shows a data packet 400 for communicating on the tree network 240 (FIG. 2) in a massively parallel computer system 100 (FIG. 1). Each data packet 400 includes a class (or virtual network ID) 410 and data 420. The class 410 is used to determine the routing of the packet to deliver data 420 on a virtual channel (described below) over the collective network (FIG. 2, 240). The class 410 is used in conjunction with the class routing table 221 to determine how to route the data packet 400 to the appropriate node on the tree network. In Blue Gene, a memory access to the collective network is accomplished by a message processing interface (MPI) library constructing a packet with the header having the proper class route information to the end location. The packet is then copied to a tree memory address for broadcast on the network. The access control mechanism monitors this tree memory address for unauthorized access to a protected virtual private network. The access control mechanism first receives a read/write packet. If the read/write packet has an address that is not in a protected memory space (in a virtual private network on this node) then the access control mechanism will allow the read/write to proceed on the node.

Figures 5, 6:
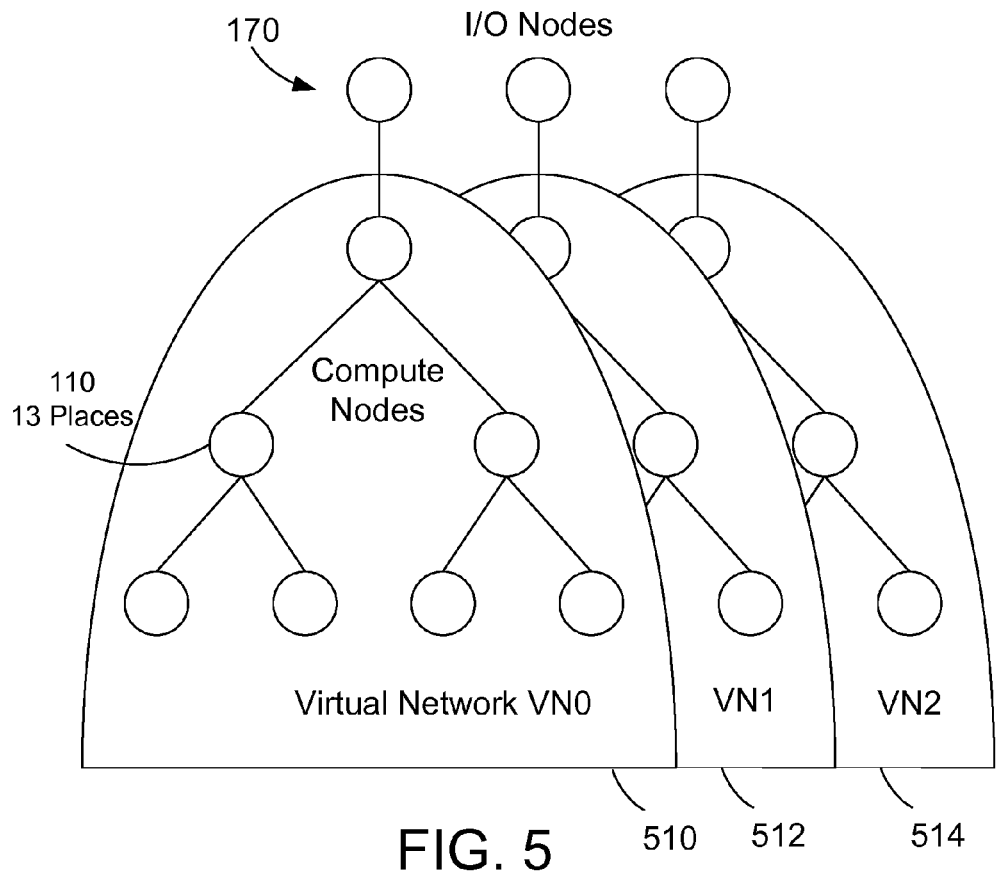
FIG. 5 shows three virtual tree networks with one of the virtual networks a protected network, or a virtual private network in a massively parallel computer system.
FIG. 6 is a table that represents access control data in a massively parallel computer system.

FIG. 5 represents a portion of the compute nodes 110 in a multi-node computer system. The compute nodes 110 are arranged in a number of virtual channels 510, 512, 514 or tree networks using the collective network described above.

FIG. 6 illustrates a table that represents access control data 222 in a multi-node computer system. The access control data 222 preferably resides in the memory of the compute node 110 as described above with reference to FIG. 2. All or parts of the access control data could also reside in the service node 140 or in data storage 138. The access control data 222 includes data associated with each of the virtual networks created on the collective network. The access control data 222 includes sets of related data that each include a class or virtual network ID 610, a security class 612 and a user 614. In the illustrated example, a virtual network ID (VN0) 616 is associated with a security class (SC1) 618 and a user (in this case the user is the system administrator) 620. Similarly, virtual network ID VN1 622 is associated with security class SC2 624 and one or more users (in this case User1) 626.

Figures 7, 8:
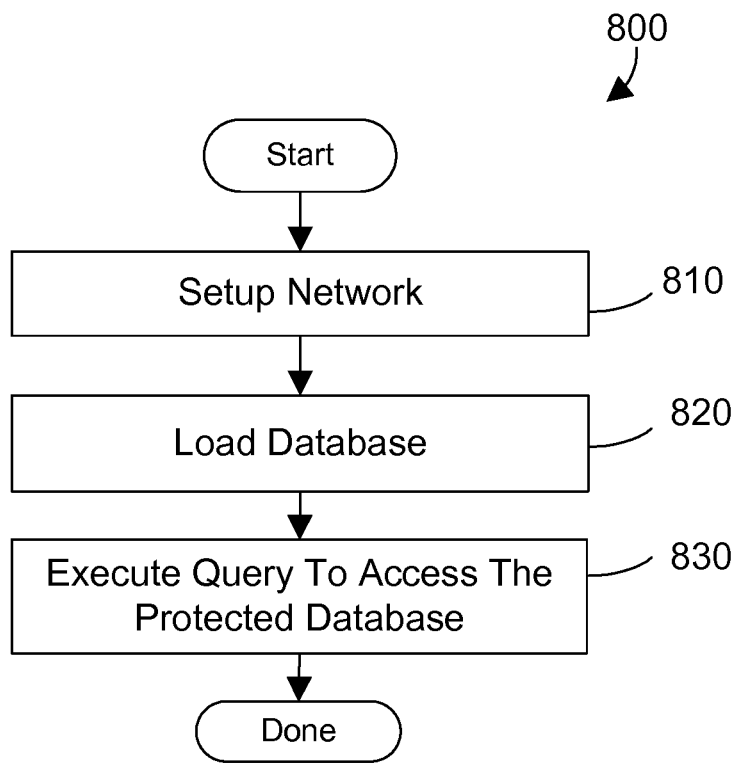
FIG. 7 is another table that represents access control data in a massively parallel computer system.
FIG. 8 is a method flow diagram of a method for data security on a parallel computer system using virtual private networks on a massively parallel computer system.

FIG. 7 illustrates a table with additional access control data 222 in a multi-node computer system. The access control data 222 in FIG. 7 may reside in the memory of the compute node 110 as described. The access control data in FIG. 7 illustrates that there is a security class for each database object that resides in a database in the parallel computer system. The security class for each database object may be realized as an attribute for each database object that is stored in the database, or it may be a table of security classes associated with database objects or types of database objects. The database may be an in-memory database as described in the background section where the entire database resides in the memory of the compute nodes. In the illustrated example, each database object 710 has a security class 712. For example, rows 1-20 714 of a particular table have an associated security class of SC2 716, while rows 20-40 718 have a security class of SC3 720.

The access setup mechanism 144 sets up access control data 222 in the nodes that describes a number of security classes. Each security class is associated with at least one virtual network. Each user on the system is associated with one or more of the security classes, and each database object that is to be protected is given an attribute of a security class. Database objects are loaded into the system nodes that match the security class of the database object. The database objects thus are loaded into the system based on the security class assigned to the database object. When a query executes on the system, the query is sent to a particular class or set of classes by sending the query on the virtual network with the corresponding security class. Thus, the query is only seen by those nodes that are authorized by the equivalent security class. In this way, the network is used to isolate data from users that do not have proper authorization to access the data as described further below.

FIG. 8 shows a method 800 for providing data space protection on a multi-node computer system using virtual private networks. The steps in method 800 are preferably performed by an access setup mechanism 144 in the service node 140 (FIG. 1) and the access control mechanism 222 (FIG. 2) in the compute node 110. The first step is to setup the network, including setting up the access control data (step 810). The next step is to load the database with data base objects according to the security class for each data base object (step 820). Next, execute a query to access the protected database on the nodes with the virtual network (step 830). The method is then done.

Figure 9:
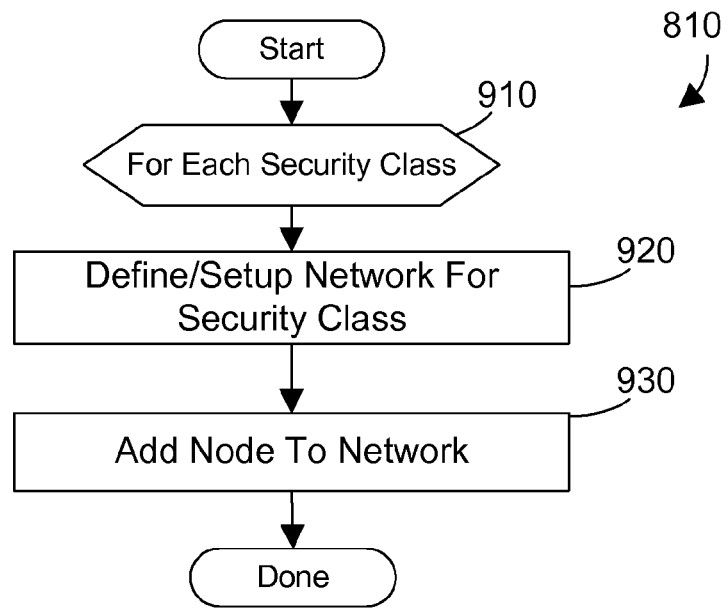
FIG. 9 is a method flow diagram that illustrates one possible implementation of step 810 in FIG. 8.

FIG. 9 shows a method 810 for setting up a network to provide object level security for database objects using a virtual private network on a parallel computer system. Method 810 is an exemplary implementation of step 810 in method 800. The steps in method 810 are preferably performed by the access setup mechanism 144 (FIG. 1) in the service node 140. The method 810 executes the subsequent steps for each security class to be defined in the parallel computer system (step 910). First, define and setup each network for each corresponding security class (step 920) and then add each node to the network by assigning a security class for each node (step 930). The method is then done.

Figure 10:
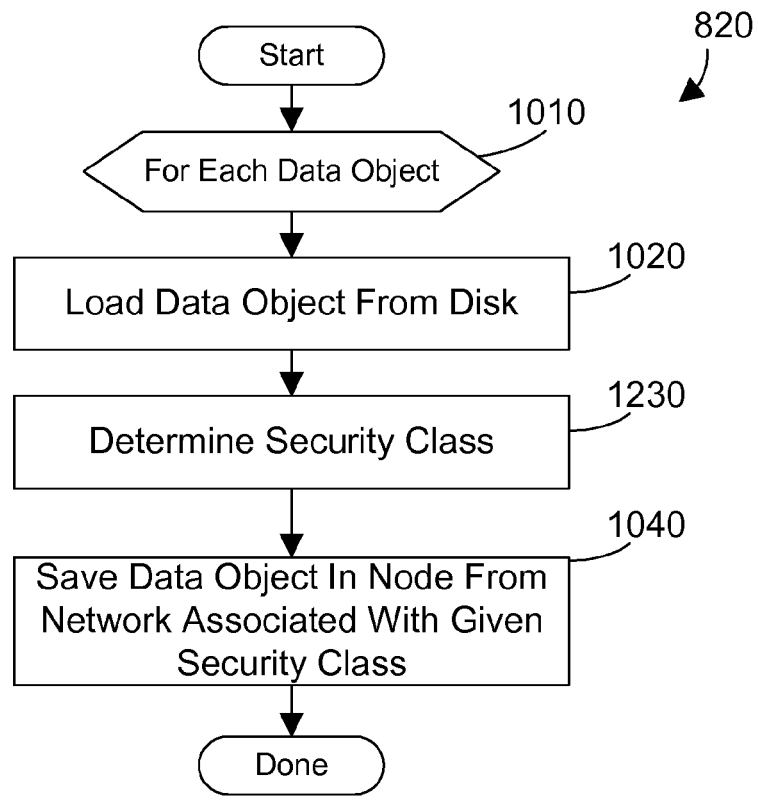
FIG. 10 is a method flow diagram that illustrates one possible implementation of step 820 in FIG. 8.

FIG. 10 shows a method 820 for loading a database on a parallel computer system to provide object level security for database objects using a virtual private network. Method 820 is an exemplary implementation of step 820 in method 800. The steps in method 820 are preferably performed by the access setup mechanism 144 (FIG. 1) in the service node 140. The method 820 executes the subsequent steps for each database object to be stored or used in the parallel computer system (step 1020). First, determine the security class for each object (step 1020) and then choose a node to store the object associated with the given security class for each node (step 1030). The method is then done.

Figure 11:
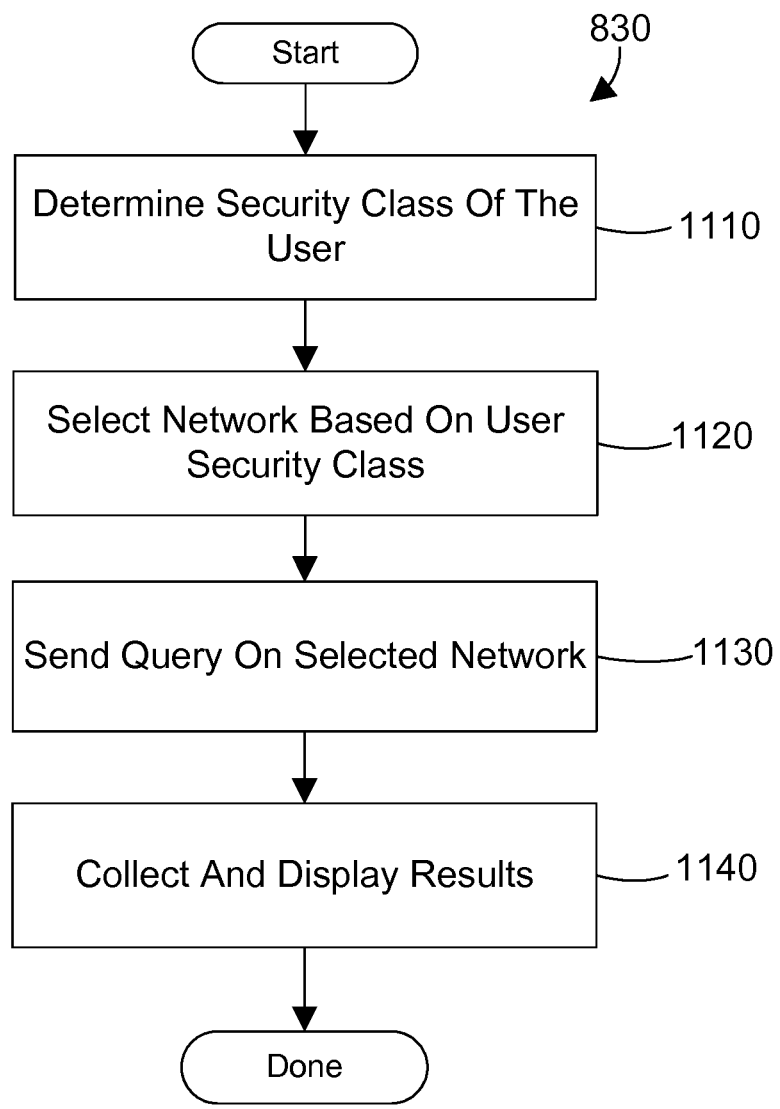
FIG. 11 is a method flow diagram that illustrates one possible implementation of step 830 in FIG. 8.

FIG. 11 shows a method 830 for executing a query to access a protected database over a virtual private network on a parallel computer system. Method 830 is an exemplary implementation of step 830 in method 800. The steps in method 830 are preferably performed by a database system that may be part of an application program operating on a node of the parallel computer system. First, determine the security class of the user associated with this query (step 1110). Select the network to execute the query based on the user's security class (step 1120). Send the query on the selected network (step 1130). Finally, collect the query results from the nodes and display results from the query to the user (step 1140). The method is then done.

An apparatus and method is described herein to provide data security on a parallel computer system using virtual networks connecting the nodes of the system. An access setup mechanism sets up access control data in the nodes that describes a number of security classes and each database object that is to be protected is given an attribute of a security class.

One skilled in the art will appreciate that many variations are possible within the scope of the claims. Thus, while the disclosure has been particularly shown and described above, it will be understood by those skilled in the art that these and other changes in form and details may be made therein without departing from the spirit and scope of the claims.

The invention claimed is:

1. A computer implemented method for data security using virtual networks in a multi-node computer system, the method comprising the steps of:
    setting up a virtual private network to make determined nodes become protected nodes by configuring access control data on the compute nodes to indicate one of a plurality of virtual networks is the virtual private network;
    loading a database in the multi-node computer system;
    executing a query to access the database objects over the virtual private network by sending a query to a particular security class so the query is only seen by those nodes that are authorized for the particular security class indicated in the access control data by performing the steps of:
    determining a security class of a user from the access control data;
    selecting the virtual private network based on the security class of the user;
    sending the query on the selected virtual private network; and
    collecting results for the query from the nodes and displaying a result to the user.

2. The computer implemented method of claim 1 wherein the multi-node computer system is a massively parallel computer system.

3. The computer implemented method of claim 1 wherein the step of setting up the virtual private network includes configuring a class routing table to set up the plurality of virtual networks.

4. The computer implemented method of claim 1 wherein the access control data is selected from the following: virtual network identification; security class, user, and a database object associated with a security class.

5. The computer implemented method of claim 1) wherein the database objects include a security class attribute to indicate in what security class to store the database object in the database.

6. A computer implemented method for data security using virtual networks in a massively parallel computer system, the method comprising the steps of:
    setting up a virtual private network to make determined nodes become protected nodes by configuring access control data on the compute nodes to indicate one of a plurality of virtual networks is the virtual private network, wherein the access control data includes a virtual network identification, security class, user, and a database object associated with a security class;
loading a database in the multi-node computer system by performing the steps of:
for each data object, perform the steps of:
determine security class corresponding to the data object; and
choose a node from a network associated with the determined security class;
determining security class of a user;
selecting the virtual private network based on the security class of the user;
executing a query by the user on the selected virtual private network to access the database objects over the virtual private network by sending a query to a particular security class so the query is only seen by those nodes that are authorized by the equivalent security class indicated in the access control data; and
collecting results for the query from the nodes and displaying a result to the user.

7. A computer implemented method for data security using virtual networks in a massively parallel multi-node computer system, the method comprising the steps of:
setting up a virtual private network to make determined nodes become protected nodes by configuring access control data on the compute nodes to indicate one of a plurality of virtual networks is the virtual private network and setting up the virtual private network includes configuring a class routing table for the plurality of virtual networks, wherein the access control data is selected from the following: virtual network identification; security class, user, and a database object associated with a security class, wherein the database objects include a security class attribute to indicate in what security class to store the database object in the database;
loading a database in the multi-node computer system;
executing a query to access the database objects over the virtual private network by sending a query to a particular security class so the query is only seen by those nodes that are authorized for the particular security class indicated in the access control data by performing the steps of:
determining the security class of a user from the access control data;
selecting the virtual private network based on the security class of the user;
sending the query on the selected virtual private network; and
collecting results for the query from the nodes and displaying a result to the user.

* * * * *